United States Patent [19]

Mitchell et al.

[11] 3,843,740

[45] Oct. 22, 1974

[54] PRODUCTION OF AROMATICS

[75] Inventors: Thomas Owen Mitchell, West Trenton; Darrell Duayne Whitehurst, Titusville, both of N.J.

[73] Assignee: Mobile Oil Corporation, New York, N.Y.

[22] Filed: Nov. 14, 1973

[21] Appl. No.: 415,702

Related U.S. Application Data

[63] Continuation-in-part of Ser. No. 308,392, Nov. 21, 1972, abandoned.

[52] U.S. Cl............... 260/673, 260/673.5, 208/64, 208/135
[51] Int. Cl............................ C07c 3/20, C07c 5/24
[58] Field of Search ......... 260/673, 673.5; 208/135, 208/64

[56] References Cited
UNITED STATES PATENTS

| | | | |
|---|---|---|---|
| 3,140,253 | 7/1967 | Plank et al.......................... | 208/120 |
| 3,308,069 | 3/1967 | Wadlinger et al. ................ | 208/111 |
| 3,702,886 | 11/1972 | Argauer et al..................... | 208/111 |
| 3,709,979 | 1/1973 | Chu .................................. | 423/328 |
| 3,729,409 | 4/1973 | Chew ................................ | 208/135 |
| 3,756,942 | 9/1973 | Cattanach.......................... | 208/137 |
| 3,760,024 | 9/1973 | Cattanach.......................... | 260/673 |
| 3,775,501 | 11/1973 | Kaeding et al..................... | 260/673 |

*Primary Examiner*—Paul M. Coughlan, Jr.
*Assistant Examiner*—Juanita M. Nelson
*Attorney, Agent, or Firm*—Andrew L. Gaboriault

[57] ABSTRACT

A modified process for aromatizing aliphatic feedstock to a principally aromatic containing liquid product and a principally light paraffin containing gas product which includes utilizing a two stage catalyst system in which the first stage is a ZSM-5 type synthetic aluminosilicate molecular sieve zeolite catalyst and the second stage is a mixture of such a ZSM-5 catalyst and a second molecular sieve (pore size about 4.5 to 6.7A) catalyst. The instant specification discloses a unique result flowing from this particular combination which is not achieved by either ZSM-5 or such second sieve alone, or by ZSM-5 mixed with such second sieve or with ZSM-5 followed by such second sieve; that is there is caused to be produced a liquid product having extremely small or no concentrations of $C_5+$ aliphatics admixed with the aromatics content thereof. In a preferred embodiment hydrogen is added to the second stage catalyst zone whereby causing the gas product produced to be predominantly LPG.

9 Claims, 1 Drawing Figure

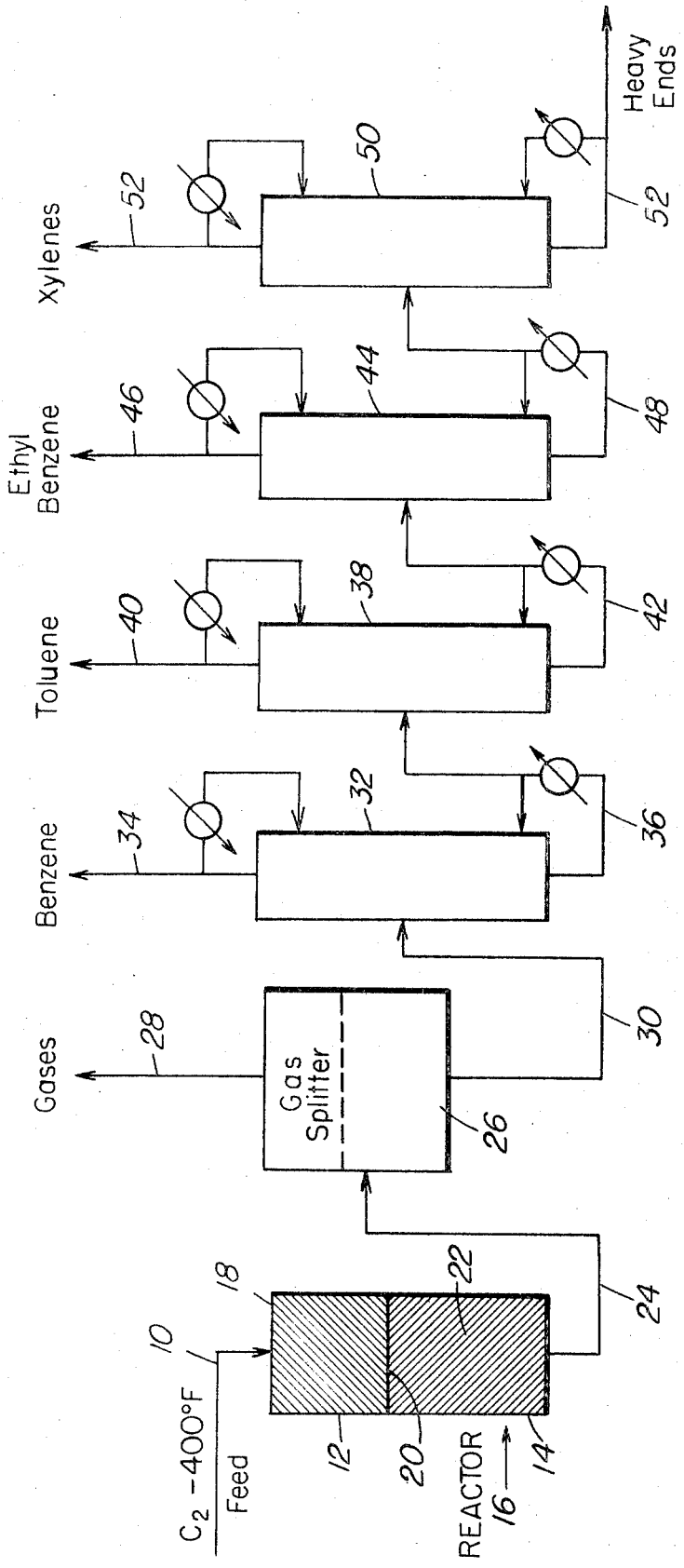

PRODUCTION OF AROMATICS

CROSS-REFERENCE TO RELATED APPLICATIONS

This application is a continuation-in-part of application Ser. No. 308,392 filed Nov. 21, 1972, now abandoned.

This invention relates to converting aliphatic organic compounds to aromatic compounds. It more particularly refers to improvements in known processes for catalytically converting aliphatic feedstock to aromatic liquids.

It is known that under certain conditions, aliphatic hydrocarbon feedstocks can be converted to a mixed liquid and gaseous product in which the liquid is predominantly, over about 90 percent, aromatic while the gas is predominantly light paraffins. This process is the subject of U.S. Patent application Ser. No. 153,855, filed June 16, 1971 now U.S. Pat. No. 3,760,024 and U.S. Pat. application Ser. No. 253,942, filed May 17, 1972 now U.S. Pat. No. 3,756,942. According to these prior applications a feed in the range of about $C_2^{--}$ to 400°F. is passed in contact with a ZSM–5 type of synthetic aluminosilicate molecular sieve zeolite catalyst at about 800° to 1500°F. at a space velocity of about 1 to 15 WHSV under such conditions that at least about 90 percent of the aromatizable feed is converted to a product having an aromatics yield of at least 30 percent by weight. As noted above, the liquid product usually comprises over 90 percent aromatics and this is usually quite sufficient for the original intended purpose of this aromatization process, that is to make very high octane number material from rather low octane feed for use as gasoline blend stock.

Aromatics are also produced from petrochemical feedstock in the course of usual petroleum refinery operations by reforming a given feedstock in contact with a platinum or bimetallic platinum containing catalyst. The aromatics-containing product stream from platinum reforming has admixed therewith substantial quantities of aliphatic materials from which the aromatics cannot be readily separated by distillation. The aliphatics are usually in the $C_5^+$ range and boil right along-side the $C_6$ to $C_9$ aromatics.

Through the years of petroleum processing, there have been developed several techniques for recovering the aromatics from platinum reforming pyrolysis and coker gasoline by solvent extraction thereof followed by appropriate purifying distillation of the non aliphatics-free aromatics. Sulfolane extraction, for example, uses sulfolane [$(CH_2)_4 - SO_2$] as the extractant, while Udex extraction uses a mixture of diethylene glycol and water as the extractant. Other processes accomplish much the same purpose using different extractants, such as liquid sulfur dioxide for example.

One of the problems associated with extracting aromatics from reformate or other refinery streams is that the stream must first be treated, as by hydrogenation for example, to eliminate olefins, particularly gum-forming dienes, therefrom.

While processing engineers and production people do not like to use extraction type of purification processes because they are expensive and because they render processing more complicated due to the need and desire to regenerate and reuse the extractant, such processes have been used to separate aromatics from reformer product because of a lack of any better way to accomplish this recovery. Further, since aromatics do not form the preponderant component of the stream from which they are taken, what is being extracted is a relatively minor stream.

When considering recovery of the aromatics portion of the liquid product of ZSM-5 aromatization, one is faced with a problem of a different order of magnitude. It would be uneconomical enough to treat this liquid to extract the less than 10 percent aliphatics portion thereof, but it is horrendous to treat the liquid in order to extract the over 90 percent aromatics portion therefrom.

While this liquid product need not be further resolved where it is to be used as a high octane gasoline blend stock, it is of insufficient purity to be further used as chemical intermediate or resolved into its individual aromatics for further chemical use. For example, one potential use of this product is to produce nitration grade toluene and to produce benzene of sufficient purity to be alkylated with ethylene to produce high purity ethyl benzene which in turn is dehydrogenated to styrene from which polystyrene polymer is produced. Anyone familiar with the polymerization art will be aware of the very high raw material purity requirement of monomers for polymerization. Therefore, while benzene and toluene can be readily separated from each other by conventional distillation unit operations, these compounds cannot be separated from close boiling aliphatics of comparable carbon atom content by conventional distillation techniques.

Aromatization by contact with catalyst of the ZSM–5 type produces a given quantity and distribution of aromatics for each given set of reaction parameters. As the severity of the aromatization increases, that is as the space velocity is lowered, or the temperature is raised, or the pressure is raised, etc., or some combination thereof, the purity of the aromatic content of the liquid product increases but the quantity of aromatics produced declines. Therefore, under prior operating conditions, one had to sacrifice yield for purity, an economic detriment. It would of course be desirable to rectify this situation.

It is therefore an important object of this invention to provide a process for producing chemical grade aromatics in yields comparable to those of high octane gasoline stock.

It is another object of this invention to provide a novel process for producing chemical grade aromatics which does not rely upon solvent extraction for product purification.

Other and additional objects of this invention will become apparent from a consideration of this entire specification including the claims and the drawing hereof.

Understanding of the invention will be facilitated by reference to the attached drawing which is a schematic flow diagram of the process of this invention.

In accord with and fulfilling these objects, one aspect of this invention resides in a process comprising introducing a feed containing individual or mixed aromatizable $C_2^{--}$ to 400°F. aliphatic hydrocarbons to an aromatization reaction zone composed of two stages. The first stage of the aromatization reaction zone is loaded with a ZSM–5 type of synthetic aluminosilicate molecular sieve zeolite catalyst and the second, or downstream, stage of the aromatization reaction zone is loaded with a mixture of such a ZSM–5 type of catalyst and a second molecular sieve catalyst having a pore size of about 4.5 to 6.7 A.

The feed is contacted successively with the catalysts of the first and second stages at a temperature of about 800°F. to 1500°F., preferably about 850° to 1200°F., depending upon the exact feed composition and other reaction parameters. The reaction zone is maintained at about 1 to 35 atmospheres absolute pressure and the feed is passed through the reaction zone at such a rate that a space velocity equivalent to about 1 to 15 WHSV is achieved. All of the reaction parameters are chosen in relation to each other and in relation to both the particular feed composition and the particular catalyst composition so that there is a minimum of about 90 percent conversion of the aromatizable components of the feed and an aromatics yield of at least 30 grams of new aromatics per 100 grams of non aromatics fed.

The catalyst used for the known process previously discussed has been stated to be a ZSM-5 type of catalyst which includes ZSM-5, ZSM-8, ZSM-11 and other similarly behaving zeolites.

ZSM-5 is disclosed and claimed in copending application Ser. No. 865,472, filed Oct. 10, 1969 now U.S. Pat. No. 3,702,886; ZSM-8 is disclosed and claimed in copending application Ser. No. 865,418, filed Oct. 10, 1969 and ZSM-11 is disclosed and claimed in copending application Ser. No. 31,421 filed Apr. 23, 1970 now U.S. Pat. No. 3,709,979.

The family of ZSM-5 compositions has the characteristic X-ray diffraction pattern set forth in Table 1 hereinbelow. ZSM-5 compositions can also be identified, in terms of more ratios of oxides, as follows:

$$0.9 \pm 0.2 \ M_{2/n}O: W_2O_3 : b \ YO_2: z \ H_2O$$

wherein M is a cation, $n$ is the valence of said cation, W is selected from the group consisting of aluminum and gallium, Y is selected from the group consisting of silicon and germanium, $z$ is from 0 to 40 and $b$ is at least 5 and preferably 15–300. In a preferred synthesized form, the zeolite has a formula, in terms of mole ratios of oxides, as follows:

$$0.9 \pm 0.2 \ M_{2/n}O : Al_2O_3 : 15\text{--}100 \ SiO_2 : z \ H_2O$$

and M is selected from the group consisting of a mixture of alkali metal cations, especially sodium and tetraalkylammonium cations, the alkyl groups of which preferably contain 2–5 carbon atoms.

In a preferred embodiment of ZSM-5, W is aluminum, Y is silicon and the silica/alumina mole ratio is at least 15, preferably at least 30.

Members of the family of ZSM-5 zeolites which include ZSM-5, ZSM-8 and ZSM-11 possess a definite distinguishing crystalline structure whose X-ray diffraction pattern shows the following significant lines:

TABLE I

| Interplanar Spacing $d(A)$ | Relative Intensity |
|---|---|
| 11.1 ± 0.2 | S |
| 10.0 ± 0.2 | S |
| 7.4 ± 0.15 | W |
| 7.1 ± 0.15 | W |
| 6.3 ± 0.1 | W |
| 6.04 ± 0.1 | W |
| 5.97 ± 0.1 | W |
| 5.56 ± 0.1 | W |
| 5.01 ± 0.1 | W |
| 4.60 ± 0.08 | W |
| 4.25 ± 0.08 | W |
| 3.85 ± 0.07 | VS |

TABLE I-Continued

| Interplanar Spacing $d(A)$ | Relative Intensity |
|---|---|
| 3.71 ± 0.05 | S |
| 3.64 ± 0.05 | M |
| 3.04 ± 0.03 | W |
| 2.99 ± 0.02 | W |
| 2.94 ± 0.02 | W |

These values, as well as all other X-ray data were determined by standard techniques. The radiation was the K-alpha doublet of copper, and a scintillation counter spectrometer with a strip chart pen recorder was used. The peak heights, I, and the positions as a function of 2 times theta, where theta is the Bragg angle, were read from the spectrometer chart. From these the relative intensities, 100 $I/I_o$, where $I_o$ is the intensity of the strongest line or peak, and $d$(obs.), the interplanar spacing in A, corresponding to the recorded lines, were calculated. In Table I the relative intensities are given in terms of the symbols S = strong, M = medium, MS = medium strong, MW = medium weak and VS = very strong. It should be understood that this X-ray diffraction pattern is characteristic of all the species of ZSM-5 compositions. Ion exchange of the sodium ion with cations reveals substantially the same pattern with some minor shifts in interplanar spacing and variation in relative intensity. Other minor variations can occur, depending on the silicon to aluminum ratio of the particular sample, as well as if it has been subjected to thermal treatment.

Zeolite ZSM-5 can be suitably prepared by preparing a solution containing water, tetrapropyl ammonium hydroxide and the elements of sodium oxide, an oxide of aluminum or gallium and an oxide of silica, and having a composition, in terms of mole ratios of oxides, falling within the following ranges:

TABLE II

| | Broad | Preferred | Particularly Preferred |
|---|---|---|---|
| $OH^-/SiO_2$ | 0.07–1.0 | 0.1–0.8 | 0.2–0.75 |
| $R_4N+/(R_4N^+,Na^+)$ | 0.2–0.95 | 0.3–0.9 | 0.4–0.9 |
| $H_2O/OH^-$ | 10–300 | 10–300 | 10–300 |
| $YO_2/W_2O_3$ | 5–100 | 10–60 | 10–40 | wherein R is propyl, W is aluminum and Y is silicon. This mixture is maintained at reaction conditions until the crystals of the zeolite are formed. Thereafter the crystals are separated from the liquid and recovered. Typical reaction conditions consist of a temperature of from about 75°C. to 175°C. for a period of about 6 hours to 60 days. A more preferred temperature range is from about 90° to 150°C., with the amount of time at a temperature in such range being from about 12 hours to 20 days.

The digestion of the gel particles is carried out until crystals form. The solid product is separated from the reaction medium, as by cooling the whole to room temperature, filtering and water washing.

ZSM-5 is preferably formed as an aluminosilicate. The composition can be prepared utilizing materials which supply the elements of the appropriate oxide. Such compositions include, for an aluminosilicate, sodium aluminate, alumina, sodium silicate, silica hydrosol, silica gel, silicic acid, sodium hydroxide and tetrapropylammonium hydroxide. It will be understood that each oxide component utilized in the reaction mixture for preparing a member of the ZSM-5 family can be supplied by one or more initial reactants and they can be mixed together in any order. For example, sodium oxide can be supplied by an aqueous solution of sodium hydroxide, or by an aqueous solution of sodium hydroxide, or by an aqueous solution of sodium silicate; tetrapropylammonium cation can be supplied by the bromide salt. The reaction mixture can be prepared either batchwise or continuously. Crystal size and crystallization time of the ZSM-5 composition will vary with the nature of the reaction mixture employed.

ZSM-8 can also be identified, in terms of mole ratios of oxides, as follows:

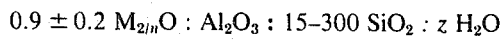

$0.9 \pm 0.2\ M_{2/n}O : Al_2O_3 : 15\text{-}300\ SiO_2 : z\ H_2O$ wherein M is at least one cation, n is the valence thereof and z is from 0 to 40. In a preferred synthesized form, the zeolite has a formula, in terms of mole ratios of oxides, as follows:

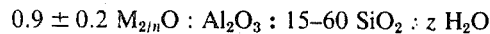

$0.9 \pm 0.2\ M_{2/n}O : Al_2O_3 : 15\text{-}60\ SiO_2 : z\ H_2O$ and M is selected from the group consisting of a mixture of alkali metal cations, especially sodium, and tetraethylammonium cations.

Zeolite ZSM-8 can be suitably prepared by reacting a water solution containing either tatraethylammonium hydroxide or tetraethylammonium bromide together with the elements of sodium oxide, aluminum oxide, and an oxide of silica.

The operable relative proportions of the various ingredients have not been fully determined and it is to be immediately understood that not any and all proportions of reactants will operate to produce the desired zeolite. In fact, completely different zeolites can be prepared utilizing the same starting materials depending upon their relative concentration and reaction conditions as is set forth in U.S. Pat. No. 3,308,069. In general, however, it has been found that when tatraethylammonium hydroxide is employed, ZSM-8 can be prepared from said hydroxide, sodium oxide, aluminum oxide, silica and water by reacting said materials in such proportions that the forming solution has a composition in terms of mole ratios of oxides falling within the following ranges:

SiO₂/Al₂O₃ – from about 10 to about 200
NA₂O/tetraethylammonium hydroxide – from about 0.05 to .020
Tetraethylammonium hydroxide/SiO₂ – from about 0.08 to 1.0
H₂O/tetraethylammonium hydroxide – from about 80 to about 200

Thereafter, Zeolite crystals are separated from the liquid and recovered. Typical reaction conditions consist of maintaining the foregoing reaction mixture at a temperature of from about 100°C. to 175°C. for a period of time of from about 6 hours to 60 days. A more preferred temperature range is from about 150° to 175°C. with the amount of time at a temperature in such range being from about 12 hours to 8 days.

ZSM-11 can also be identified, in terms of mole ratios of oxides, as follows:

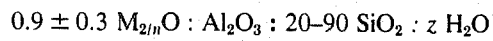

$0.9 \pm 0.3\ M_{2/n}O : Al_2O_3 : 20\text{-}90\ SiO_2 : z\ H_2O$ wherein M is at least one cation, n is the valence thereof and z is from 6 to 12. In a preferred synthesized form, the zeolite has a formula, in terms of mole ratios of oxides, as follows:

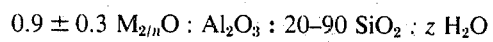

$0.9 \pm 0.3\ M_{2/n}O : Al_2O_3 : 20\text{-}90\ SiO_2 : z\ H_2O$ and M is selected from the group consisting of a mixture of alkali metal cations, especially sodium, and tetrabutylammonium cations.

ZSM-11 can be suitably prepared by preparing a solution containing (R₄X)₂O, sodium oxide, an oxide of aluminum or gallium, an oxide of silicon or germanium and water and having a composition, in terms of mole ratios of oxides, falling within the following ranges:

|  | Broad | Preferred |
| --- | --- | --- |
| YO₂/WO₂ | 10–150 | 20–90 |
| Na₂O/YO₂ | .05–0.7 | 0.05–0.40 |
| (R₄X)₂O/YO₂ | 0.02–0.20 | 0.02–0.15 |
| H₂O/Na₂O | 50–800 | 100–600 | wherein R₄X is a cation of a quaternary compound of an element of Group 5A of the Periodic Table, W is aluminum or gallium and Y is silicon or germanium maintaining the mixture until crystals of the zeolite are formed. Preferably, crystallization is performed under pressure in an autocalve or static bomb reactor. The temperature ranges from 100°C – 200°C. generally, but at lower temperatures, e.g. about 100°C., crystallization time is longer. Thereafter the crystals are separated from the liquid and recovered. The new zeolite is preferably formed in an aluminosilicate form.

An embodiment of the ZSM-5 portion of the catalyst resides in the use of a porous matrix together with the ZSM-5 type family of zeolite previously described. The zeolite can be combined, dispersed, or otherwise intimately admixed with the porous matrix in such proportions that resulting products contain from 1 to 95 percent by weight and preferably from 10 to 70 percent by weight of the zeolite in the final composite.

The term "porous matrix" includes non-zeolitic inorganic compositions with which the zeolites can be combined, dispersed or otherwise intimately admixed wherein the matrix may be catalytically active or inactive. It is to be understood that the porosity of the composition employed as a matrix can be either inherent in the particular material or it can be introduced by mechanical or chemical means. Representative of matrices which can be employed include metals and alloys thereof, sintered metals, and sintered glass, asbestos, silicon carbide, aggregates, pumice, firebrick, diatomaceous earths, alumina and inorganic oxides. Inorganic compositions, especially those comprising alumina and those of siliceous nature are preferred. Of these matrices inorganic oxides such as clay, chemically treated clays, silica, silica alumina, etc. as well as alumina, are particularly preferred because of their superior porosity, attrition resistance and stability.

Techniques for incorporating the ZSM-5 type family of zeolites into a matrix are conventional in the art and are set forth in U.S. Pat. No. 3,140,253.

It is to be noted that when a ZSM-5 type zeolite is used in combination with a porous matrix, space velocities which may be set forth as parameters for this process are based on the total catalyst, that is the ZSM-5 and the porous matrix if present. Thus, whether a ZSM-5 type zeolite is used alone or in a porous matrix, the space velocities in all cases refer to the total catalyst.

It is known that zeolites, particularly synthetic zeolites can have their composition modified by impregnating certain metals thereonto and/or thereinto. The composition can also be modified by exchanging various anions and/or cations into the crystal structure of the zeolite, replacing more or less of the ions originally present upon production of the zeolite.

The ZSM-5 type family of zeolites have been found to be especially active for aromatization if they have at least a portion of the original cations associated therewith replaced by any of a wide variety of other cations according to techniques well known in the art. Typical replacing cations would include hydrogen, ammonium, and metal cations, including mixtures of the same. Of the replacing cations, preference is given to cations of hydrogen, ammonium, rare earth, cadmium, zinc, calcium, nickel and mixtures thereof. Particularly effective members of the ZSM-5 type family of zeolites are those which have been base exchanged with hydrogen ions, ammonium ions, zinc ions or mixtures thereof. Most especially zinc ZSM-5 is the best presently known catalyst for aromatizations as set forth.

Typical ion exchange techniques would be to contact a ZSM-5 type of zeolite with a salt of the desired replacing cation or cations. Although a wide variety of salts can be employed, particular preference is given to chlorides, nitrates and sulfates.

Representative ion exchange techniques are disclosed in a wide variety of patents, including U.S. Pat. Nos. 3,140,249; 3,140,251 and 3,140,253.

It is also within the scope of the aromatization process to which this application is directed to incorporate a desired metallic component onto the ZSM-5 type family of zeolites by techniques other than ion exchange. Thus, for example, it is possible to impregnate a desired metallic component, such as zinc, platinum or palladium, thereinto by conventional impregnation techniques, as well as merely depositing the elemental metal onto the particular zeolite and in some cases, such as with zinc oxide, to incorporate the metal by physical admixture of the zeolite with an insoluble metal compound.

In any event, following contact with a salt solution of the desired replacing cation and water washing in the case of ion exchange preparations the zeolites are dried at a temperature ranging from 150° to about 600°F. and thereafter heated in air or inert gas at temperatures ranging from about 500°F. to 1500°F. for periods of time ranging from 1 to 48 hours or more. It is noted that this heat treatment can be carried out in situ, i.e., while the particular aromatization reaction is taking place, but it is preferred to carry it out as a separate step prior to carrying out the aromatization reaction.

In the second or downstream stage of this process, the catalyst is a mixture of a ZSM-5 type of synthetic crystalline aluminosilicate molecular sieve zeolite and a second molecular sieve zeolite. These second molecular sieves have a pore opening of about 4.5 to 6.7A and are exemplified by stilbite, laumontite, cancrinite, erionite, offretite, clinoptilolite, ferrierite, zeolite α, zeolite N-A, zeolite ZK-21, zeolite ZK-22, zeolite T, Zeolite L, dachiaradite, epistiloite and chabazite. These exemplary second catalyst components are to be distinguished from other molecular sieves which are not considered to be appropriate such as zeolite ZSM-3, zeolite ZSM-4, zeolite ZSM-2, zeolite Ω, zeolite β, zeolite ZK-19, zeolite ZK-20, phillipsite, zeolite ZK-5, zeolite ZK-4, zeolite A, zeolite X, zeolite Y, mordenite, analcite, paulingite, faujasite, gismondine, harmatone, gmelinite, mesolite and ptiolite.

The molecular sieve catalyst components used alone or in admixture as aforesaid can be in the hydrogen or ammonium form in which they are formed or made or to which stage they are converted. They can also be used in a form in which one or more other elements have been exchanged and/or impregnated thereinto. Of particular interest as additional cations are the metals of groups IB, IIB, and VIII, most especially nickel, silver, copper, zinc, cadmium and mixtures thereof.

As described above, it is often desirable to utilize the first and/or second stage catalyst in a binder matrix. It is within the scope of this invention to provide the second stage catalyst as a single matrix having both components therein or as separate matrices of each individual component. Other techniques for putting up the second stage, or mixed, catalyst include those set forth in U.S. Pat. No. 3,210,267.

The catalyst mixture in the second stage of the reaction zone referred to herein suitably has a proportion of about 0.1 to 10 parts by weight of ZSM-5 type molecular sieve per part of second molecular sieve, preferably about 0.3 to 3 parts by weight of ZSM-5 per part of second molecular sieve. The second stage mixed catalyst may be used in a proportion of about 0.5 to 2 parts by weight per part by weight of the first stage catalyst, preferably about 0.9 to 1.1 parts per part by weight.

In general the operating parameters of both catalyst stages, that is temperature, pressure, throughput, etc. will be about the same. Some variation, however, is within the scope of this invention. In fact, the two catalyst stages may not even have the same geometry, although in most cases they will. The second stage may be operated at about 900° to 1200°F., at about 1 to 15 WHSV preferably 1–12 WHSV and at a pressure of about 1 to 35 atmospheres absolute. The exact operating parameters of the second stage depend upon the composition of the product, particularly the liquid product, leaving the first stage, and the allowable composition of the BTX (benzene, toluene, xylene) product.

The operating parameters of the first stage catalyst reaction zone should be such combination of conditions as to assure that at least about 80 percent of the C+ product effluent is aromatic.

The operating parameters of the second stage catalyst reaction zone should be such combination of conditions as to assure that substantially all, at least about 95 to 98 percent, of the liquid product thereof is aromatic and that at least about 95 to 99 percent of the liquid aliphatics fed thereinto in the first stage liquid product is converted to additional aromatics and/or to nonliquid (gaseous) products.

It will be noted that in one embodiment of the process of this invention has a distinct advantage over prior art recovery of aromatics directly from reformate by extraction in that it produces hydrogen as a byproduct, the proces operating without hydrogen being added to the reactant and in fact generating hydrogen, and in that it acts as well or better on unsaturated (olefinic) components of the feed as on other components and therefore need not go through a hydrogenation as is noted above to be required where aromatics are directly extracted from reformate. Still further, the aromatization process described herein is substantially insensitive to sulfur content of the feed. In fact, in terms of the liquid product, there is inherent sulfur purification in that any sulfur in the feed tends to concentrate in the gas product. Thus, the BTX which is produced is of exceptionally high purity.

Referring now to the drawing, a suitable feed 10, which may for example be straight run or light naphtha, pyrolysis gasoline, reformate, raffinate or coker gasoline as well as propane and/or olefin containing light gases, is introduced into and through a first stage 12 and thence directly through a second stage 14 of a reaction zone 16. The first stage 12 contains a ZSM-5 type of catalyst 18 and is suitably separated from the second stage 14 by a screen 20. The second stage contains a mixed catalyst comprising ZSM-5 and a second molecular sieve 22. If desired, the supporting screen 20 may be omitted.

Product 24 from the reaction zone 16 is mixed gas and liquid and is fed to a conventional gas-liquid separator means 26 which may be a hold tank or the like. The gases 28 evolved from the splitter 26 are suitably used as such for their fuel value or further processed as is conventional with a light gas refinery stream. These gases are generally a mixture of hydrogen and $C_1$ to $C_3$ paraffins. Other components such as olefins may be present in smaller proportions.

The liquid product 30 from the gas-liquid splitter 26 is suitably resolved, by distillation only, in a multiple column assembly. In the first column 32 benzene 34 is taken overhead while the higher boiling materials 36 are fed to the second column 38 from which toluene 40 is taken overhead. The higher boiling residue 42 from the toluene column 38 can be distilled to separate a mixture of xylene isomers and ethyl benzene, which boil fairly close together and a distillate with a heavy ends impurity stream taken as bottoms. More preferably, the raffinate 42 from the toluene column 38 is carefully distilled in an accurate fractionating column 44 to take ethylbenzene 46 overhead and then the bottoms 48 are finally distilled 50 to separate the xylene isomers 52 from the heavy ends impurities 54. The xylene isomers can be resolved by conventional procedures if desired and the heavy ends can be discarded, burned or otherwise used as is conventional.

In a preferred aspect of this invention where it is particularly desired that the gas 28 being removed from the gas splitter 26 is saturated and therefore useful as LPG, liquified petroleum gas, it is desirable to provide a separate external feed of hydrogen to the reactor second stage 14 either concurrent with the effluent of the first reactor stage 12 or injected at some other point along the catalyst bed 22. Injection of hydrogen into this second stage reactor causes the shape selective cracking taking place therein to result in a predominantly saturated gas product and the resistance of the catalyst to aging is substantially improved.

The following examples serve to illustrate this invention without being limiting thereon. They particularly point out the unusual synergistic relationship between the particular catalysts combined in the manner set forth above. In these examples, parts and percentages are by weight unless expressly stated to the contrary.

EXAMPLES 1–29

These examples illustrate a typical aromatization process using a ZSM-5 catalyst alone. The catalyst used in these examples was pellets composed of 65 percent $NH_4$ ZSM-5 and 35 alumina which had been calcined in air at 1000°F. The feed was 100° to 290°F: pyrolysis gasoline having the following composition:

| | | |
|---|---|---|
| $C_3$ to $C_8$ Aliphatics | | 50.2% |
| Saturates | 32.2% | |
| Monoolefins | 15.0% | |
| Diolefins | 3.0% | |
| $C_6$ to $C_8$ Aromatics | | 49.8% |
| Benzene | 29.2% | |
| Toluene | 14.9% | |
| $C_8$+ aromatics | 5.7% | |

This feed was passed through a downflow reactor through an annular catalyst bed of the aforesaid composition at various temperatures and space velocities. Data taken from these runs are set forth in the following Table 1.

TABLE III

PYROLYSIS GASOLINE PASSED OVER HZSM-5

| Example | °C Temp. | hr⁻¹ WHSV | Liq. Prod. wt% Yield | Aliphatics | Benzene | Toluene | $C_8^+$ Aromatics | Gas | % Conversion | Selectivity to Aromatics |
|---|---|---|---|---|---|---|---|---|---|---|
| 1 | 500 | 9.1 | 74.8 | 18.2 | 32.7 | 26.5 | 22.6 | 25.2 | 73.0 | 31.2 |
| 2 | 450 | 9.1 | 86.5 | 28.6 | 27.9 | 20.7 | 22.9 | 13.5 | 50.8 | 47.1 |
| 3 | 550 | 9.1 | 69.7 | 9.8 | 35.3 | 32.3 | 22.6 | 30.3 | 86.5 | 27.4 |
| 4 | 500 | 9.1 | 79.6 | 20.6 | 31.2 | 25.6 | 22.6 | 20.4 | 67.5 | 40.0 |
| 5 | 550 | 29.2 | 67.3 | 18.9 | 32.2 | 22.5 | 26.4 | 32.7 | 74.5 | 13.1 |
| 6 | 500 | 29.2 | 80.2 | 30.3 | 30.2 | 20.1 | 19.4 | 19.8 | 51.7 | 23.5 |
| 7 | 487 | 58.4 | 84 | 33.2 | 31.2 | 19.2 | 16.4 | 16.0 | 44.6 | 28.1 |
| 8 | 564 | 13.75 | 70 | 12.4 | 37.3 | 28.3 | 22.0 | 30.0 | 82.9 | 27.3 |
| 9 | 568 | 58.4 | 63 | 20.7 | 30.1 | 25.6 | 15.6 | 37.0 | 74.0 | 2.7 |
| 10 | 523 | 58.4 | 77.3 | 26.9 | 30.3 | 19.5 | 23.3 | 22.7 | 58.5 | 22.5 |
| 11 | 550 | 3.06 | 70.5 | 5.1 | 35.7 | 32.1 | 27.1 | 29.5 | 93.0 | 36.9 |
| 12 | 400 | 9.1 | 100 | 38.5 | 28.7 | 17.5 | 15.3 | 0.0 | 23.2 | 100.0 |
| 13 | 350 | 9.1 | 99 | 43.2 | 29.4 | 16.2 | 11.2 | 1.0 | 14.7 | 87.0 |
| 14 | 350 | 3.06 | 101 | 39.2 | 27.0 | 15.8 | 18.0 | 0.0 | 21.9 | 100.0 |
| 15 | 400 | 3.06 | 99 | 36.1 | 26.6 | 17.0 | 20.3 | 1.0 | 28.7 | 93.2 |
| 16 | 550 | 3.06 | 74.6 | 7.6 | 39.0 | 32.8 | 20.6 | 25.3 | 88.4 | 43.0 |
| 17 | 550 | 3.06 | 74.9 | 9.0 | 38.5 | 32.3 | 20.3 | 25.2 | 86.6 | 42.0 |
| 18 | 550 | 3.06 | 74.6 | 6.3 | 39.1 | 33.3 | 21.3 | 25.4 | 90.6 | 44.3 |
| 19 | 550 | 3.06 | 74.6 | 9.8 | 37.7 | 31.0 | 21.5 | 25.4 | 85.6 | 40.8 |
| 20 | 550 | 3.06 | 80.0 | 14.2 | 36.3 | 29.4 | 20.1 | 20.0 | 76.7 | 48.6 |
| 21 | 575 | 1.69 | 74 | 2.5 | 41.0 | 33.9 | 22.6 | 26.0 | 96.5 | 46.6 |

TABLE III—Continued

PYROLYSIS GASOLINE PASSED OVER HZSM-5

| Example | °C Temp. | hr$^{-1}$ WHSV | Liq. Prod. wt% Yield | Aliphatics | Benzene | Toluene | C$_8^+$ Aromatics | Gas | % Conversion | Selectivity to Aromatics |
|---|---|---|---|---|---|---|---|---|---|---|
| 22 | 575 | 1.69 | 71 | 2.2 | 42.7 | 35.7 | 19.4 | 29.0 | 97.0 | 40.9 |
| 23 | 575 | 1.69 | 59 | 7.9 | 39.3 | 30.2 | 22.6 | 41.0 | 90.5 | 10.0 |
| 24 | 575 | 1.69 | 66 | 10.0 | 40.3 | 30.4 | 19.3 | 34.0 | 84.6 | 22.2 |
| 25 | 575 | 1.69 | 95 | 45.6 | 32.9 | 16.1 | 5.4 | 5.0 | 13.1 | 29.3 |
| 26 | 575 | 1.00 | 72 | 4.6 | 40.8 | 33.7 | 20.9 | 28.0 | 93.5 | 40.7 |
| 27 | 575 | 1.00 | 75 | 4.3 | 41.1 | 34.1 | 20.5 | 25.0 | 93.7 | 47.8 |
| 28 | 575 | 1.00 | 75 | 4.2 | 39.8 | 33.8 | 22.0 | 25.0 | 93.9 | 47.7 |
| 29 | 575 | 1.00 | 75 | 4.0 | 39.9 | 33.8 | 22.1 | 25.0 | 94.0 | 47.7 |

TABLE IV

Changes in Composition of Pyrolysis Gasoline Upon Passing Over HZSM-5
g/100g feed

| Example | Loss of Non-Aromatics | Change in Benzene | Gain in Toluene | Gain in Higher Aromatics | Total Gain in Aromatics |
|---|---|---|---|---|---|
| 1 | 36.6 | −4.8 | 4.9 | 11.3 | 11.4 |
| 2 | 25.5 | −5.1 | 3.0 | 14.1 | 12.0 |
| 3 | 43.4 | −4.6 | 7.6 | 10.1 | 13.1 |
| 4 | 33.8 | −4.4 | 5.5 | 12.3 | 13.4 |
| 5 | 37.4 | −7.6 | 0.2 | 12.1 | 4.7 |
| 6 | 25.9 | −5.0 | 1.2 | 9.9 | 6.1 |
| 7 | 22.4 | −3.0 | 1.3 | 8.1 | 6.4 |
| 8 | 41.5 | −3.1 | 4.9 | 9.7 | 11.5 |
| 9 | 37.1 | −5.2 | 1.2 | 4.1 | 0.1 |
| 10 | 29.3 | −5.8 | 0.1 | 12.3 | 6.6 |
| 11 | 46.6 | −4.1 | 7.7 | 13.5 | 17.1 |
| 12 | 11.7 | −0.5 | 2.6 | 9.6 | 11.7 |
| 13 | 7.4 | −0.1 | 1.1 | 5.4 | 6.4 |
| 14 | 11.0 | −2.2 | 0.9 | 12.3 | 11.0 |
| 15 | 14.4 | −2.8 | 1.8 | 14.4 | 13.4 |
| 16 | 44.5 | −0.1 | 9.6 | 9.7 | 19.2 |
| 17 | 43.5 | −0.4 | 9.3 | 9.4 | 18.3 |
| 18 | 45.5 | 0.0 | 9.9 | 10.2 | 20.1 |
| 19 | 42.9 | −1.1 | 8.3 | 10.3 | 17.5 |
| 20 | 38.8 | −0.2 | 8.6 | 10.4 | 18.8 |
| 21 | 48.4 | +1.1 | 10.3 | 11.0 | 22.4 |
| 22 | 48.6 | +1.1 | 10.4 | 8.1 | 19.6 |
| 23 | 45.5 | −5.9 | 2.9 | 7.6 | 4.6 |
| 24 | 43.6 | −2.6 | 5.2 | 7.0 | 9.6 |
| 25 | 6.9 | +2.0 | 0.4 | (−0.5) | 1.9 |
| 26 | 46.9 | +0.2 | 9.3 | 9.4 | 18.9 |
| 27 | 47.0 | +1.6 | 10.7 | 9.7 | 22.0 |
| 28 | 47.1 | +0.7 | 10.5 | 9.1 | 20.3 |
| 29 | 47.2 | +0.8 | 10.5 | 9.1 | 20.4 |
| (%in feed | 50.2 | 29.2 | 14.9 | 5.7) | |

The catalyst used in the process of Examples 1–29 was compared in the following examples, under entirely analogous conditions, with the following two stage catalysts in a similar reaction zone:

TABLE V

| Designation | First Stage | Second Stage |
|---|---|---|
| A | HZSM-5 | 1:1 weight ratio HZSM-5/H-erionite |
| B | H-erionite | H-erionite |
| C | 1:1 weight ratio HZSM-5/H-erionite | 1:1 weight ratio HZSM-5/H-erionite |
| D | 1:1 weight ratio H-erionite/zeolon | 1:1 weight ratio H-erionite/zeolon |
| E | HZSM-5 | H-erionite |
| F | HZSM-5 | HZSM-5 |
| G | MgO | MgO |

EXAMPLES 30–32

Initial runs were made to determine the aromatization catalyzing ability of the materials set forth in Table III other than HZSM-5. A feed as set forth in Table I was passed downwardly through a reaction zone as per the procedure used in Examples 1 through 29. The reaction temperature was maintained at 575°C. (1067°F.) and the throughput was maintained so as to give a space velocity of about 1 to 3 WHSV. The process carried out with H-erionite, H-erionite/zeolon and magnesium oxide as catalysts (materials B, D and G) produced a slight diminution of aromatics in the liquid product as compared to the feed. It can therefore be said that these three materials are not aromatization catalysts for this type of feed under this type of processing conditions.

After a short time on stream, only unconverted feed was produced with these materials. The data for these runs are set forth in Table VI below.

TABLE VI

Feed = Pyrolysis Gasoline  
Temp. = 1067°F.  
Liquid Product Composition

| Example | Catalyst | WHSV | Time on Stream | % Liquid Yield | Non-Arom. $C_5^-$ | Non-Arom. $C_6^+$ | Aromatics $A_6$ | $A_7$ | $A_8$ | $A_9$ | $A_{10}^+$ |
|---|---|---|---|---|---|---|---|---|---|---|---|
| 30 | B | 1 | 0.5 | 100 | 17.5 | 13.7 | 39.2 | 21.2 | 5.1 | .9 | 2.4 |
|    | B | 1 | 2.2 | 100 | 30.9 | 15.5 | 32.2 | 16.0 | 3.9 | .5 | 1 |
|    | B | 1 | 3   | 85  | 30.5 | 16.5 | 31.8 | 15.7 | 3.6 | .4 | 1.5 |
| 31 | D | 1.5 | 3 | 84 | 23.5 | 14.7 | 35.2 | 19.2 | 4.6 | .7 | 2.1 |
| 32 | G | 1 | 3.2 | 90 | (47) |      | 35.5 | 11.7 | 3.8 | .4 | 1.2 |

EXAMPLES 33–35

The process of Examples 30–32 was repeated substituting materials C and E, that is mixed HZSM-5 and H-erionite, and successive HZSM-5 and H-erionite respectively as catalysts. These materials showed some aromatization catalytic activity. However, such activity was related to the quantity of HZSM-5 in the catalyst and to the location thereof. Thus, at 90 percent conversion the mixed HZSM-5/H-erionite and the sequential HZSM-5 followed by H-erionite produced aromatics selectively in the product of about 42 percent while HZSM-5 alone shows an aromatics selectivity of 46 percent. At 85 percent conversion the aromatics selectivity was 39, 40 and 42 percent respectively.

A showed 44 percent. These data indicate that in the initial aromatization reaction stages the catalyst of this invention was superior to straight mixtures and sequential components and was almost as good as its prime aromatization component. After 6 hours on stream the process using the catalyst of this invention has maintained its selectivity at about 45 percent but the HZSM-5 catalyst has had its selectivity reduced to 40 percent, the sequential HZSM-5 followed by H-erionite is reduced to 35 percent and the mixed HZSM-5/H-erionite is reduced to 21 percent.

Under identical conditions the comparative conversions and other data obtained from these runs are set forth in the following table:

TABLE VII

|  |  |  |  |  | Liquid Product Composition |  |  |  |  |  |  |
|---|---|---|---|---|---|---|---|---|---|---|---|
|  |  |  | Time on Stream (hrs.) | % Liquid Yield | Non-Arom. $C_5^-$ | Non-Arom. $C_6^+$ | Aromatics $A_6$ | $A_7$ | $A_8$ | $A_9$ | $A_{10}^+$ |
| Example | Catalyst | WHSV |  |  |  |  |  |  |  |  |  |
| 44 | A | 1.13 | 2 | 73 | 1.1 | 0 | 4 | 38 | 11 | 3 | 5 |
| 45 | A | 1.13 | 3 | 73 | 1.4 | 0 | 43 | 38 | 11 | 3 | 4 |
| 46 | A | 1.13 | 4 | 73 | 1.5 | 0 | 42 | 37 | 11 | 3 | 5 |
| 47 | A | 1.13 | 6 | 73 | 1.5 | 0 | 41 | 37 | 11 | 3 | 6 |
| 48 | F | 1.0 | 2 | 72 | 2.2 | 1.1 | 41 | 34 | 12 | 3 | 6 |
| 49 | F | 1.0 | 3.4 | 75 | 2.3 | 0.9 | 41 | 34 | 12 | 3 | 5 |
| 50 | F | 1.0 | 4.1 | 74 | 2.1 | 1.0 | 41 | 34 | 12 | 3 | 7 |
| 51 | F | 1.0 | 6 | 75 | 2.0 | 1.0 | 40 | 34 | 12 | 3 | 7 |
| 52 | C | .977 | 0.5 | 73 | 1.0 | 2.8 | 44 | 34 | 11 | 3 | 4 |
| 53 | C | .977 | 4 | 67 | 4. | 3. | 40 | 31 | 12 | 3 | 4 |
| 54 | E | 1.0 | 3.3 | 66 | 2.4 | 1.3 | 41 | 33 | 12 | 3 | 6 |

EXAMPLES 36–43

In these examples identical processes as set forth in Examples 33 and 34 were run comparing a catalyst according to this invention (A) with a mixed HZSM-5/H-erionite (C), a sequential HZSM-5 followed by H-erionite (E) and HZSM-5 alone (F). The first set of comparisons are of aromatics selectivity as a function of time on stream. After 3 hours on stream catalyst C showed a selectivity of 26 percent, catalyst E showed 40 percent, catalyst F showed 47 percent and catalyst

EXAMPLES 55–56

Studies were made to determine the effect of the various catalysts on the aliphatic content and the aromatic distribution in the liquid product of an aromatization process carried out as set forth in Example 30. The comparison was between a catalyst according to this invention and an HZSM-5 catalyst alone. All runs were directly comparable. The liquid product showed the following component distribution for the two catalysts tested.

| Catalyst | $C_5^-$ | $C_6^+$ | Benzene | Toluene | Xylene | $C_9Ar$ | $C_{10}^+Ar$ |
|---|---|---|---|---|---|---|---|
| A | 1.1 | 0 | 42 | 38 | 11 | 3 | 5 |
| F | 2.3 | 0.9 | 42 | 35 | 12 | 3 | 5 |

These data clearly show that the catalyst according to this invention has at least as good time on stream related yields, conversions and selectivities as the best of its components and has superior product distribution as compared to the catalytically most active of its component materials.

EXAMPLES 57–62

The following examples demonstrate that HZSM-5 and ZnZSM-5 catalysts when used in the absence of co-catalyst are not as effective in producing the desired product as the preferred catalyst composition. In fact, if higher severity is used to decrease the $C_5^+$ non-aromatic yield in the liquid product, an overall loss in aromatic yield is observed and a larger proportionate amount of less desired $C_{10}^+$ aromatics are formed.

TABLE VIII

Feed = $C_6$–265°F. Reformate      Temp. = 1022°F.

| Example | Catalyst | WHSV | Time on Stream | % Liquid Yield | Non-Arom. $C_5^-$ | $C_6^+$ | $A_6$ | $A_7$ | Aromatics $A_8$ | $A_9$ | $A_{10}^+$ |
|---------|----------|------|----------------|----------------|------------------|---------|-------|-------|-----------------|-------|------------|
| 57 | F ($Zn^{+2}$ form) | 1.1 | | 76 | [0.3] | | 26 | 43 | 18 | 3 | 10 |
| 58 | do. | 0.57 | | 70 | [0.14] | | 26 | 41 | 16 | 1 | 14 |

Feed = $C_5$–230°F. FCC Gasoline      Temp. = 1022°F.

| Example | Catalyst | WHSV | Time on Stream | % Liquid Yield | Non-Arom. $C_5^-$ | $C_6^+$ | $A_6$ | $A_7$ | Aromatics $A_8$ | $A_9$ | $A_{10}^+$ |
|---------|----------|------|----------------|----------------|------------------|---------|-------|-------|-----------------|-------|------------|
| 59 | F | 1.3 | | 54 | [0.6] | | 26 | 38 | 19 | 6 | 11 |
| 60 | do | 0.62 | | 58 | [0.2] | | 33 | 39 | 12 | 2 | 14 |
| 61 | do | 0.10 | | 55 | [0.2] | | 38 | 31 | 9 | 2 | 20 |
| 62 | F ($Zn^{+2}$ form) | 0.3 | | 67 | [0.3] | | 21 | 42 | 23 | 3 | 11 |

What is claimed is:

1. In a process of aromatizing a feed hydrocarbon comprising at least one $C_2^{--}$ to 400°F. component to a product comprising a liquid which is predominantly aromatic, and gas by contacting such feed in a reaction zone with a ZSM-5 type synthetic aluminosilicate molecular sieve catalyst at about 800° to 1500°F., a pressure of about 1 to 35 atmospheres absolute and a space velocity equivalent to about 1 to 15 WHSV in the absence of added hydrogen under such combination of conditions as to convert at least 90 percent of the aromatizable feed to a product in a yield of at least 30 grams of aromatics per 100 grams of non-aromatics in the feed; the improvement, whereby increasing the proportion of aromatics in said liquid product, which comprises utilizing as the catalyst in said reaction zone a first, upstream catalyst comprising a ZSM-5 type of synthetic aluminosilicate molecular sieve zeolite and a second, downstream catalyst comprising a mixture of a ZSM-5 type of synthetic aluminosilicate molecular sieve zeolite and a second molecular sieve zeolite having pore size of about 4.5 to 6.7A.

2. A process as claimed in claim 1 wherein said second stage catalyst comprises about 0.5 to 2 parts by weight of ZSM-5 per part by weight of said second sieve.

3. A process as claimed in claim 1 wherein the conversion in said first stage is at least about 80 percent.

4. A process as claimed in claim 1 wherein said second molecular sieve zeolite is at least one member selected from the group consisting of stilbite, laumontite, cancrinite, erionite, offretite, clinoptilolite, ferrierite, zeolite α, zeolite N–A, zeolite ZK–21, zeolite ZK–22, zeolite T, zeolite L, dachiaradite, epistilbite and chabazite.

5. A process as claimed in claim 4 wherein said second molecular sieve is erionite.

6. A process as claimed in claim 1 wherein said second stage catalyst contains about 0.1 to 10 parts by weight of said ZSM-5 type of molecular sieve per part by weight of said second molecular sieve.

7. A process as claimed in claim 1 wherein said feed is selected from the group consisting of straight run naphtha, light naphtha, pyrolysis gasoline, reformate, raffinate, coker gasoline and mixtures thereof.

8. A process as claimed in claim 1 wherein said ZSM-5 type of molecular sieve is ZSM-5.

9. A process as claimed in claim 1 wherein hydrogen is fed to said second downstream catalyst.

* * * * *

UNITED STATES PATENT OFFICE
CERTIFICATE OF CORRECTION

Patent No. 3,843,740   Dated October 22, 1974

Inventor(s) Thomas O. Mitchell and Darrell D. Whitehurst

It is certified that error appears in the above-identified patent and that said Letters Patent are hereby corrected as shown below:

| | |
|---|---|
| Column 5, lines 6, 7 | Delete "or by an aqueous solution of sodium hydroxide". |
| Column 5, line 58 | Delete "Zeolite" and substitute --the--. |
| Column 10, line 29 | Change "35 alumina" to --35% alumina--. |
| Column 10, Table III, Line 12 under % Conversion | Change "23.2" to --23.3--. |

Signed and sealed this 11th day of February 1975.

(SEAL)
Attest:

RUTH C. MASON
Attesting Officer

C. MARSHALL DANN
Commissioner of Patents
and Trademarks